(12) United States Patent
Levinzon

(10) Patent No.: US 7,036,378 B2
(45) Date of Patent: May 2, 2006

(54) HIGH AND LOW FREQUENCY BAND DUAL OUTPUT TRANSDUCER

(75) Inventor: Feliz A. Levinzon, Mission Viejo, CA (US)

(73) Assignee: Endevco Corporation, San Juan Capistrano, CA (US)

( * ) Notice: Subject to any disclaimer, the term of this patent is extended or adjusted under 35 U.S.C. 154(b) by 152 days.

(21) Appl. No.: 09/924,960

(22) Filed: Aug. 8, 2001

(65) Prior Publication Data

US 2003/0164761 A1 Sep. 4, 2003

Related U.S. Application Data

(60) Provisional application No. 60/223,884, filed on Aug. 9, 2000.

(51) Int. Cl.
*G01H 11/08* (2006.01)

(52) U.S. Cl. .................. 73/654; 73/659; 73/862.59
(58) Field of Classification Search .................. 73/654, 73/658, 659, 514.15, 862.59
See application file for complete search history.

(56) References Cited

U.S. PATENT DOCUMENTS

| | | | | |
|---|---|---|---|---|
| 5,220,836 A | | 6/1993 | Harms et al. .................. 73/702 |
| 5,714,687 A | * | 2/1998 | Dunegan ...................... 73/587 |
| 6,092,412 A | * | 7/2000 | Flechsig et al. ............... 73/105 |
| 6,205,872 B1 | | 3/2001 | Pflueg ........................ 73/866.5 |

OTHER PUBLICATIONS

Adel S. Sedra and Kenneth C. Smith, Microelectric Circuits, 787–793 (2nd Edition, 1987).
"Industrial Accelerometer", (Endevco Model 5220) pp 1–6 (Mar. 29, 2000).

* cited by examiner

*Primary Examiner*—John E. Chapman
(74) *Attorney, Agent, or Firm*—Hamilton, Brook Smith & Reynolds, P.C.

(57) ABSTRACT

A sensor circuit, method, and system for conversion of a high-impedance, broad frequency range signal from a transducer into two low-impedance signals, one containing high-frequency components and another containing low-frequency components of the input signal. The transducer can be a piezoelectric (PE) transducer transforming motion or vibration into a high-impedance electrical signal with a broad frequency range. A low-frequency circuit output can contain the frequencies in the linear region of the transducer's frequency band. The high-frequency output can contain the natural resonance frequency of the transducer. The circuit includes a low-frequency filter amplifier module and a high-frequency filter amplifier module, both amplifier modules having negative feedback, high input impedance, and low output impedance; the outputs may include a DC bias. The circuit may also include a source follower isolating the filter amplifier modules from each other. Optionally, the source follower is electrically disposed between the transducer and the high frequency filter amplifier module and employs an operational amplifier. The voltage supply for the source follower can be provided by the output of the low-frequency filter amplifier. The circuit may include a variety of means aimed at eliminating noise and temperature sensitivity.

55 Claims, 9 Drawing Sheets

HIGH AND LOW FREQUENCY BAND DUAL OUTPUT TRANSDUCER

RELATED APPLICATION

This application claims the benefit of U.S. Provisional Application No. 60/223,884, filed on Aug. 9, 2000; the entire teachings of which are incorporated herein by reference.

BACKGROUND OF THE INVENTION

Transducers are devices used for converting energy from one form to another to measure a physical quantity. A typical transducer converts mechanical force or acceleration into electromagnetic energy. A transducer is mechanically coupled to an object to measure its motion. When this motion is vibrational, usually only certain frequency ranges are of interest. In such cases, a sensor employs a transducer and some means of filtering out the unwanted frequencies. To achieve this filtering, the sensor normally includes: (a) a transducer providing an output signal with a broad frequency range and (b) an amplifying and filtering circuit that is electrically connected to the transducer's output and eliminates the unwanted frequencies outside a given frequency band of interest.

Existing sensors are designed for sensing either low-frequency vibrations or high-frequency vibrations. To obtain signals representing both the low-frequency vibrations and high-frequency vibrations, two sensors must be used.

SUMMARY OF THE INVENTION

The principles of the present invention teach a sensor that can operate with a single transducer and an electronic circuit having two filtering circuits providing separate outputs. By combining at least two filtering functions into a single circuit that can convert a single transducer output into corresponding electrical signals, the sensor is reduced in size, weight, and cost, and provides improved performance for measurement systems where measurement of multiple frequency signals are needed. For example, the low-frequency, linear region of the transducer signal provides force or motion information, and the high, natural resonance frequency of the transducer signal can be used as a diagnostic signal or other status indicator.

One embodiment of the present invention accomplishes this task by using an innovative electronic circuit which converts a high-impedance, broad frequency range signal from a transducer into two low-impedance outputs. Typically, one output provides high-frequency signals and the other output provides low-frequency signals. The circuit may also amplify and/or offset the signal. Output signal offset can be used to put the signal within the delivery range needed by a system using the present invention and to establish a proper bias for electronic components to avoid clipping and saturation in their operation within an embodiment of the invention.

The low-frequency output signal can contain, for example, the frequency components corresponding to the linear part of the transducer's frequency response band, providing force or motion information. The high-frequency output signal can contain, for example, the frequency components corresponding to the natural resonance frequency of the transducer, which may be designed at a select frequency for high sensitivity based on the dynamics of the system being monitored for vibration. The high-frequency signal can be used as a diagnostic signal or other status indicator.

The transducer can be, for example, a piezoelectric (PE) transducer transforming a sensed force or mechanical vibration into a corresponding high-impedance electrical signal with a broad frequency range, where the transfer function is essentially linear with low hysteresis.

In one embodiment, the electronic circuit includes a low-frequency filter amplifier module and a high-frequency filter amplifier module. Both filter amplifier modules have high input impedance, low output impedance, and negative feedback. The negative feedback may be provided by respective single capacitors. The filter amplifier circuit outputs may be DC-biased to provide sufficient signal swing without clipping or saturating circuit components.

The electronic circuit may further include a buffer to isolate the filter amplifier modules from each other. In one embodiment, the buffer is electrically disposed between an input to the circuit and an input to the high-frequency filter amplifier module. In an alternate embodiment, the buffer is electrically disposed between the input to the circuit and an input to the low-frequency filter amplifier module.

The buffer can be implemented in the form of an operational amplifier arranged in a source follower configuration. The buffer may be unipolar, with one power rail receiving power from the output of the low-frequency filter amplifier module and the other power rail being connected to power return or ground. This arrangement has the advantage of not having to use separate power sources for the low- and high-frequency filter amplifier circuits and the buffer.

Because the low-frequency filter amplifier module's input is electrically connected directly to the transducer, a capacitor or an equivalent circuit can be electrically disposed between the buffer's output and the high-frequency filter amplifier module's input to ensure similar input impedances on the inputs of both filter amplifier modules.

In an alternative embodiment, the buffer is electrically disposed between the transducer and the low-frequency amplifier module. In this embodiment, a capacitor or an equivalent circuit providing a transducer-like output impedance can be electrically disposed between the buffer's output and the low-frequency filter amplifier module's input.

The circuit may include a variety of means aimed at eliminating noise and temperature dependence of the circuits' components and characteristics.

Figure 1:
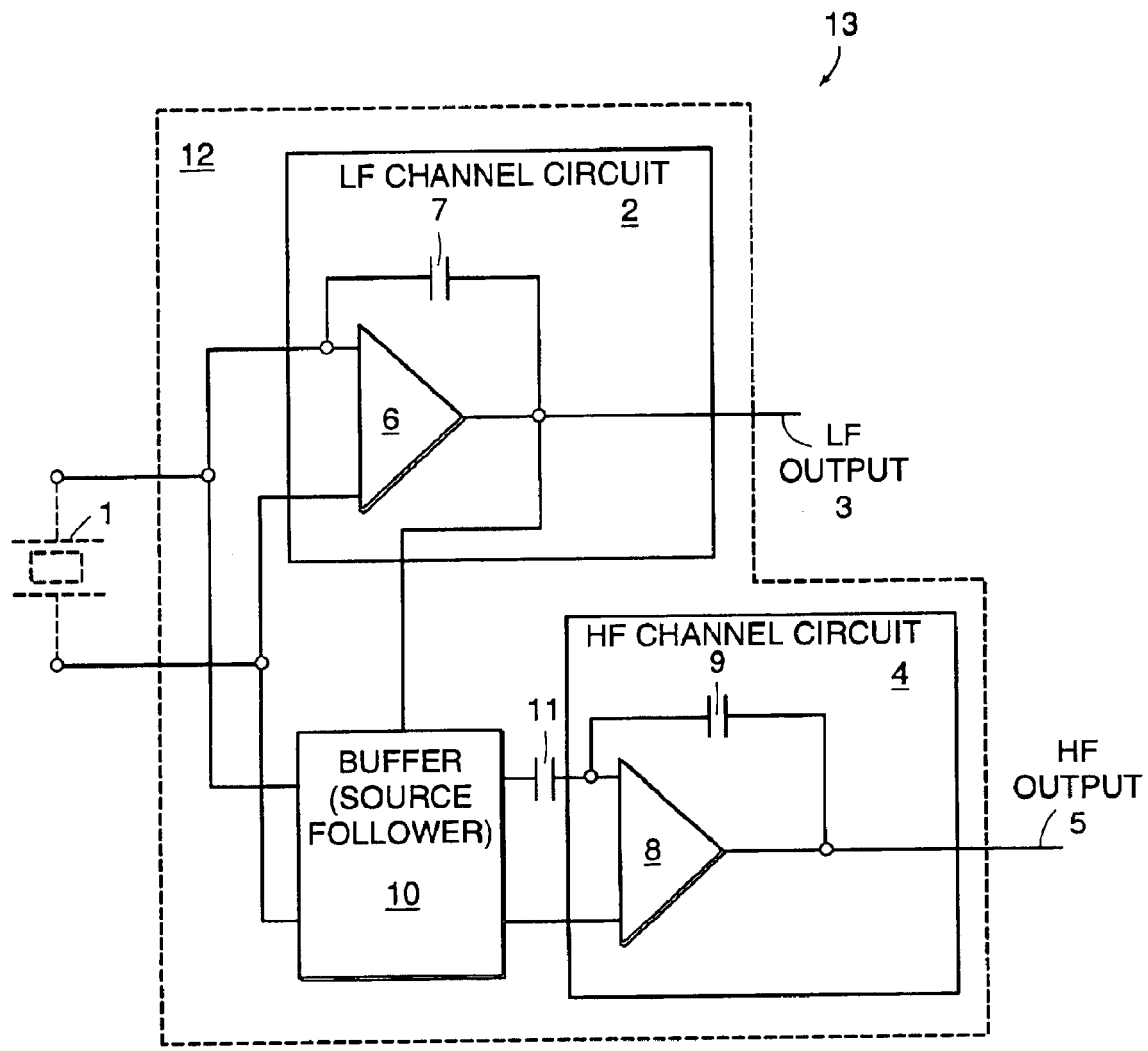
FIG. 1 is a block diagram of a sensor providing low- and high-frequency outputs according to the principles of the present invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

FIG. 1 is a block diagram of an embodiment of a sensor 13 according to the principles of the present invention. The sensor 13 comprises a transducer 1 and an electronic circuit 12. The electronic circuit 12 includes a low-frequency channel circuit 2 and high-frequency channel circuit 4.

A high-impedance signal from the transducer 1 is processed by the low-frequency channel circuit 2 and high-frequency channel circuit 4. The low-frequency channel circuit 2 produces a DC-biased, low-impedance, low-frequency signal on a first output terminal 3; the high-frequency channel circuit 4 produces a DC-biased, low-impedance, high-frequency signal on a second output terminal 5.

The low-frequency channel circuit 2 includes a low-frequency filter amplifier 6 and a negative feedback path 7, which is composed of a single capacitor in this embodiment. The low-frequency filter amplifier 6 has a high input impedance and low output impedance.

The high-frequency channel circuit 4 includes a high-frequency filter amplifier 8 and a negative feedback path 9, which is also composed of a single capacitor in this embodiment. The high-frequency filter amplifier 8 has a high input impedance and low output impedance.

The electronic circuit 12 also includes a buffer 10, configured here as a source follower, which provides a high impedance (i.e., isolation) and eliminates cross-coupling between the high-frequency filter amplifier 8 and the low-frequency filter amplifier 6. In one embodiment, the voltage supply for the buffer 10 is provided by the DC-biased low-frequency output 3 so that the source follower 10 does not need its own power supply. The source follower 10 has a high input impedance and low output impedance.

The high-frequency channel circuit 4 receives the output of buffer 10 through a capacitor 11. The capacitor 11 ensures similar input impedances on the input of low-frequency filter amplifier 6, which is connected directly to the transducer 1, and on the input of high-frequency filter amplifier 8. The capacitor 11 also rejects low frequency variations on the output of the buffer 10 caused in part by using the output of the low-frequency output 3 of the low-frequency channel circuit 2 as a voltage supply for the buffer 10.

One use of the sensor 13 is in a motion sensing application in which the transducer 1 is a piezoelectric (PE) transducer detecting motion in a linear, low-hysteresis, high-sensitivity manner. In such applications, a high-frequency output signal of the transducer 1 includes a signal that is representative of the natural mechanical resonance frequency of the transducer 1, while a low-frequency output signal includes a frequency range of signals that are representative of signals within the frequency range corresponding to the linear, low-frequency motion of the transducer 1. Thus, a single transducer and single circuit can be provided by the present invention sensor 13 to provide motion information containing the low- and high-frequency signals simultaneously. Such information can presently be provided only by two separate transducers and circuits of prior art sensor systems. Thus, the size, weight, and cost of the motion sensing system is reduced and the performance is improved.

Figure 2:
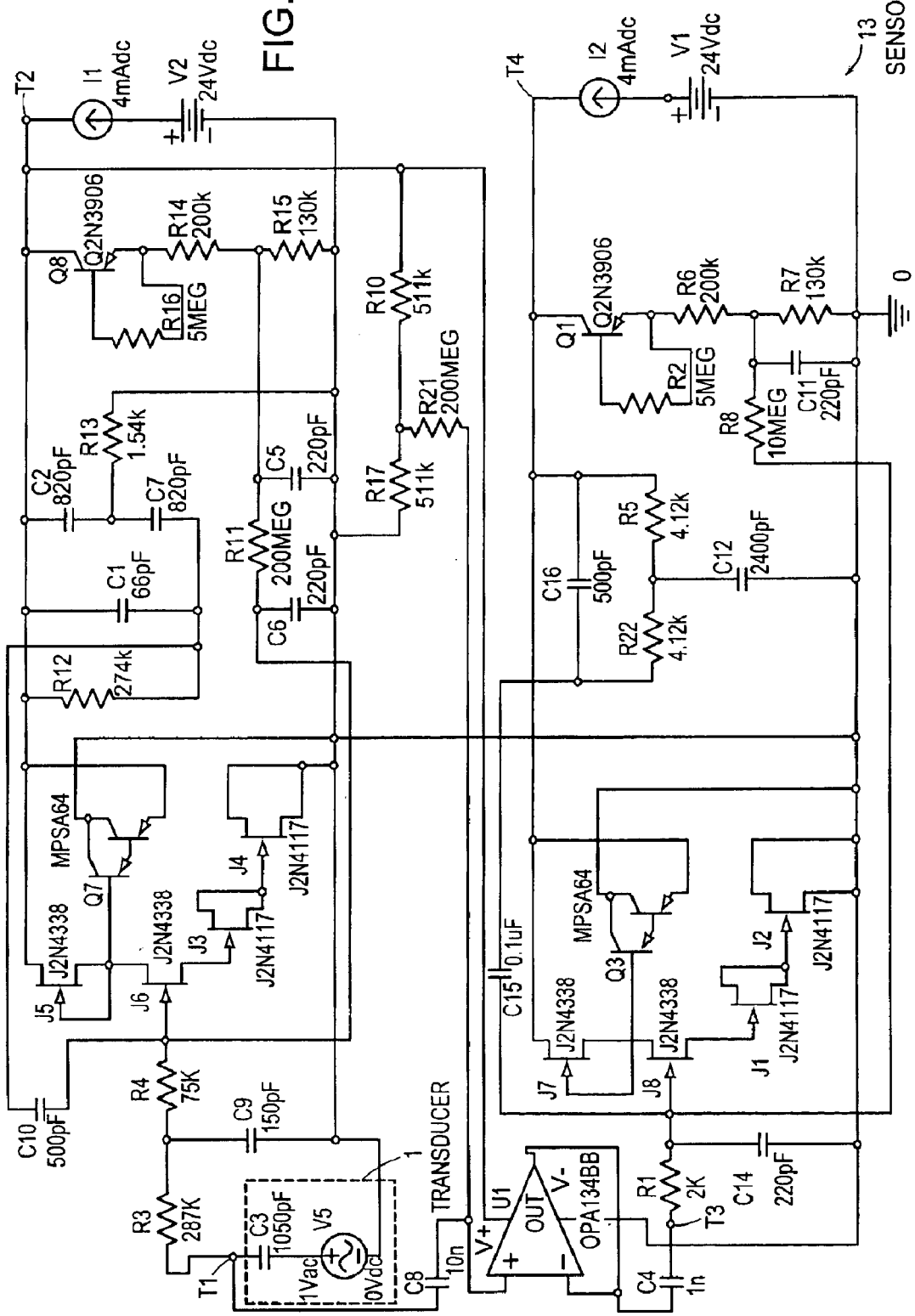
FIG. 2 is an electrical schematic diagram of the sensor of FIG. 1.

FIG. 2 is an electrical schematic diagram of an embodiment of the sensor 13. Before describing circuit specifics, correspondence between the schematic diagram of FIG. 2 and block diagram of FIG. 1 is provided.

The sensor 13 includes the transducer 1 and electronic circuit 12. The electronic circuit 12 includes low-frequency channel circuit 2, high-frequency channel circuit 4, and buffer 10.

The low-frequency channel circuit 2 includes a low-frequency channel input terminal T1 and low-frequency channel output terminal T2. Similarly, the high-frequency channel circuit 4 includes a high-frequency channel input terminal T3 and high-frequency channel output terminal T4.

The buffer 10 is implemented as a unity gain source follower through the use of an operational amplifier U1. The buffer 10 receives power from the low-frequency channel output terminal T2 and power return (i.e., ground) 0.

While the schematic diagram of FIG. 2 is believed sufficient to make the properties of the sensor 13 apparent to a person skilled in the pertinent field, some details and features of the sensor are specifically pointed out.

The input impedance of the low frequency channel circuit 2 is equal to the parallel combination of R11 and the gate resistance of J6 (i.e., $(R_{J6} \cdot R11)/(R_{J6}+R11)=200$ Mohm). Similarly, the input impedance of the high frequency channel circuit 4 is equal to the parallel combination of R21 and the input impedance of U1 (i.e., $(R_{U1} \cdot R21)/(R_{U1}+R21)=200$ Mohm).

The n-channel JFET transistor J6 amplifies the input signal on its gate, reduces the output noise, and ensures the high input impedance for the low-frequency filter amplifier 6. The n-channel JFET transistor J8 provides the same features for the high-frequency. filter amplifier 8.

The p-n-p transistor Q8, together with the resistors R1, R14, R15, and R16 and the capacitors C5 and C6, provide a proper biasing and reduce the noise on the gate of the JFET transistor J6 in the low-frequency filter amplifier 6.

The p-n-p transistor Q1, together with the resistors R2, R6, R7, and R8 and the capacitors C11 and C14, provide a proper biasing and reduce the noise on the gate of JFET transistor J8 in the high-frequency filter amplifier 8.

The p-n-p Darlington transistor Q7 ensures the low output impedance of the low-frequency filter amplifier 6; its emitter and collector are connected to the output wires of the low-frequency filter amplifier 6. The n-channel JFET transistor J5 ensures the proper regime for the Darlington transistor Q7. The p-n-p Darlington transistor Q3 and the n-channel JFET transistor J7 provide the same features for the high-frequency filter amplifier 8.

In the low-frequency filter amplifier 6, the capacitors C1, C2, and C7 together with the resistors R12 and R13 function as a two-pole, active, low-pass filter with a rise beginning at about 500 Hz and having a peak at about 10 kHz. The capacitor C10 functions as the negative feedback 7. The resistor R11 together with the capacitor C10 functions as a one-pole high-pass filter with the frequency cutoff (−3 dB)

of about 1.5 Hz, for the low-frequency filter amplifier 6. The resistors R3 and R4 together with the capacitor C9 function as a one-pole low-pass pre-filter with the frequency cutoff (−3 dB) of about 460 Hz, for the low-frequency filter amplifier 6. Thus, the composite low-pass filter has a frequency range (−3 dB) of about 1.5 Hz to 8 kHz.

In the high-frequency filter amplifier 8, the capacitors C16 and C12 together with the resistors R22 and R5 function as a two-pole high-pass filter with the frequency range (−3 dB) of about 19 kHz to 52 kHz; the capacitor C16 also functions as the negative feedback 9. The resistor R1 together with the capacitor C4 function as a one-pole low-pass pre-filter with the frequency cutoff (−3 dB) of about 80 kHz, for the high-frequency filter amplifier 8.

In the embodiment of FIG. 2, the values and configuration of the components involved in filtering signals within sensor 13 are designed according to the principles of filter design commonly known in electrical engineering and similar arts and described, for example, in Adel S. Sedra & Kenneth C. Smith, Microelectronic Circuits 787–89, 792–93 (2d ed. 1987). Alternatively, active filter design principles may be used for both the low-frequency filter amplifier 6 and high-frequency filter amplifier 8 as well as for pre-filtering of an input signal. An active or passive biquad filter design can be used.

The capacitor C4 on FIG. 2 corresponds to the capacitor 11 on FIG. 1. Its function is to establish on the input of the high-frequency filter amplifier 8 the input characteristics similar to those provided by the transducer 1 on the input of the low-frequency filter amplifier 6. To achieve this, the characteristics of capacitor C4 should be similar to the characteristics of the transducer's capacitance, represented in FIG. 2 as C3.

The capacitor C15 provides additional DC decoupling between the input and output of the high-frequency filter amplifier 8.

The operational amplifier U1 is configured as a source follower and functions as the buffer 10. The resistors R17, R10, and R21 establish the proper input offset, and the capacitor C8 provides DC decoupling for the input of the buffer 10. The power for the operational amplifier U1 is provided by the output of the low-frequency filter amplifier 6.

The low-frequency filter amplifier 6 has a two-wires output and, therefore, includes both the voltage source V2 (24 V DC) and the current source I1 (4 mA). The voltage source V1 and current source I2 provide the same functions for the high-frequency filter amplifier 8.

In the sensor 13 shown in FIG. 2, each output T2, T4 provides the same sensor gain of 2 mV/pC and the same maximum output swing of 5V. For a 50 pC/g transducer 1, each output provides the same sensor 13 sensitivity of 100 mV/g.

Figure 3:
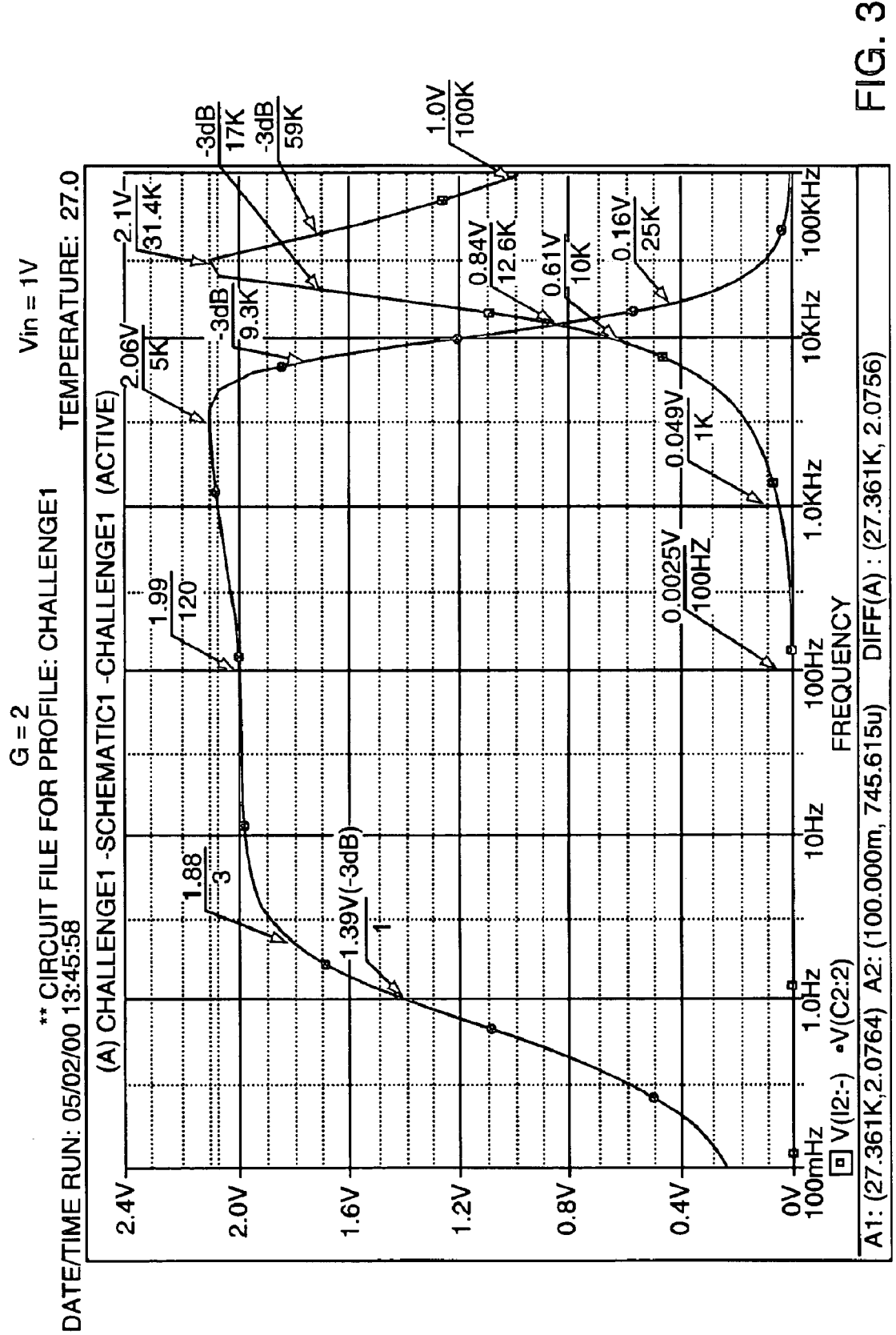
FIG. 3 is a Bode plot of the calculated frequency responses for the low- and high-frequency outputs of the sensor of FIG. 2.

FIG. 3 is a Bode plot of magnitude responses of the low-frequency channel circuit 2 and the high-frequency channel circuit 4 for the embodiment of the sensor 13 shown in FIG. 2. The Bode plot is representative of the low- and high-frequency outputs of the sensor 13 when the transducer input to the circuit 12 is a swept sine wave having an amplitude of 1 volt. The Bode plot was obtained by simulating the circuit of FIG. 2 using ORCAD®, a standard electronics design and simulation software program. The units of the horizontal logarithmic axis are frequency. The vertical linear axis is showing magnitude of the output in volts.

A circuit embodying the schematic circuit of FIG. 2 was implemented on a breadboard and its frequency response was tested at room temperature (25 degrees Celsius) and elevated temperature (120 degrees Celsius). This test yielded practically the same results as were obtained by computer simulations. FIGS. 4, 5, 6, and 7 are sinesweep plots of that breadboarded circuit and have the same axes as the Bode plot of FIG. 3 for comparison purposes.

Figure 4:
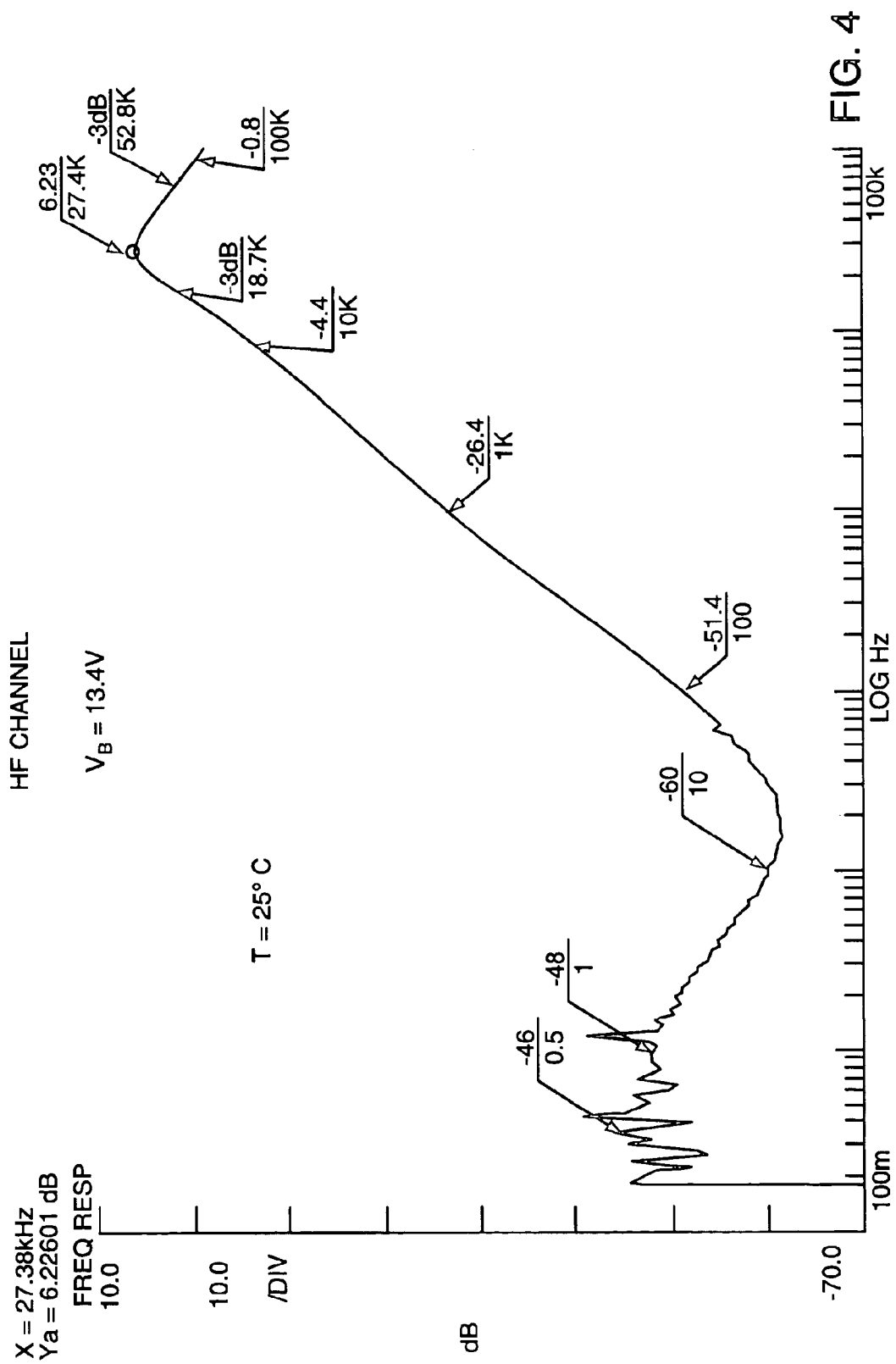
FIG. 4 is a Bode plot of a measured frequency response of the high-frequency output of the sensor of FIG. 2 at a temperature of 25 degrees Celsius.

FIG. 4 is a Bode plot of a measured frequency response of the high-frequency output of the implementation of the sensor 13 of FIG. 2 at the temperature of 25 degrees Celsius. For the reference frequency of 27.38 kHz, the −3 dB points are measured to be 18.7 kHz and 52.8 kHz as expected for the two-pole high-pass filter configuration discussed above and shown on FIG. 2.

Figure 5:
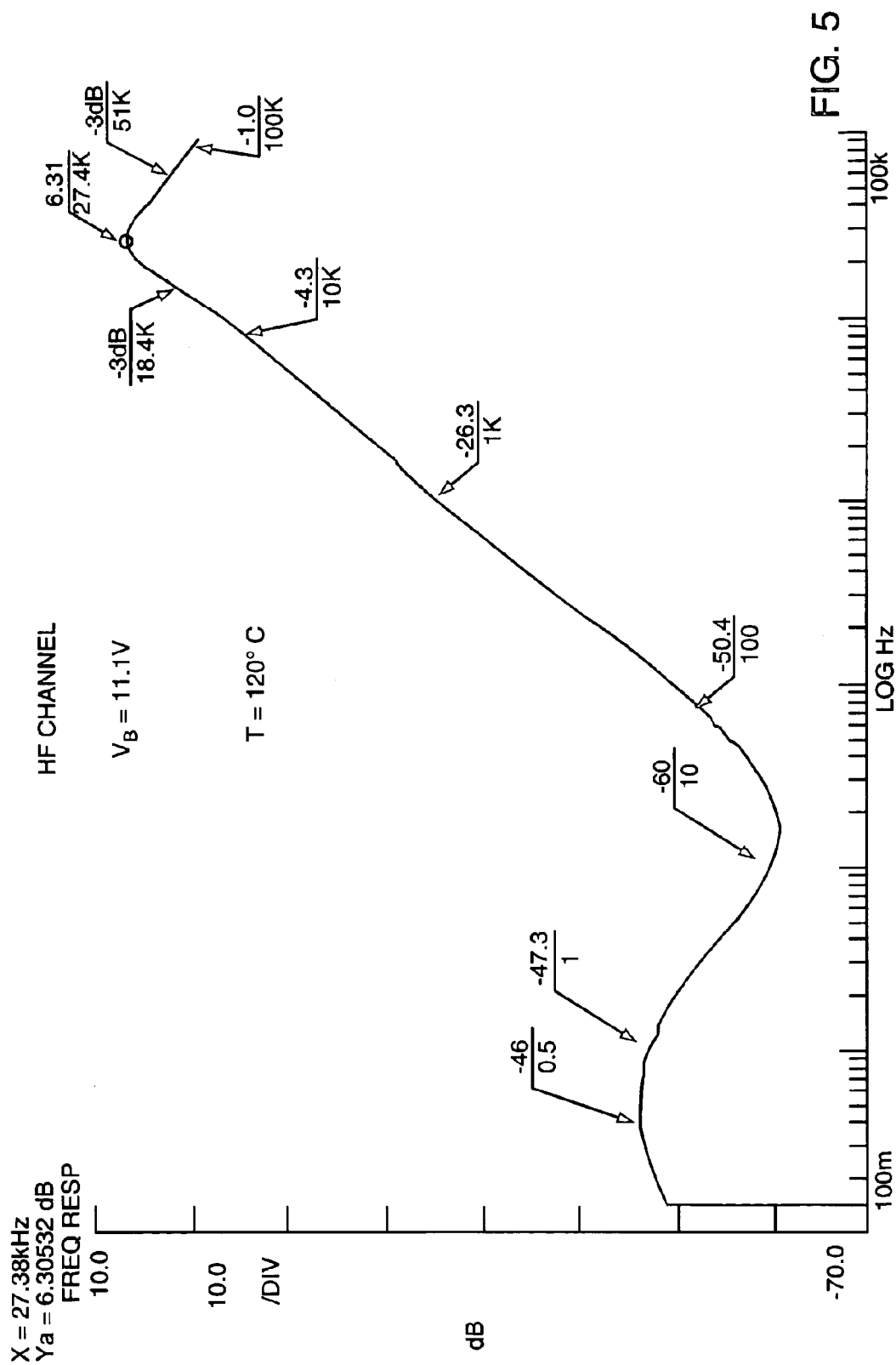
FIG. 5 is a Bode plot of a measured frequency response of the high-frequency output of the sensor of FIG. 2 at a temperature of 120 degrees Celsius.

FIG. 5 is a Bode plot of a measured frequency response of the high-frequency output of the implementation of the sensor 13 of FIG. 2 at the temperature of 120 degrees Celsius.

Figure 6:
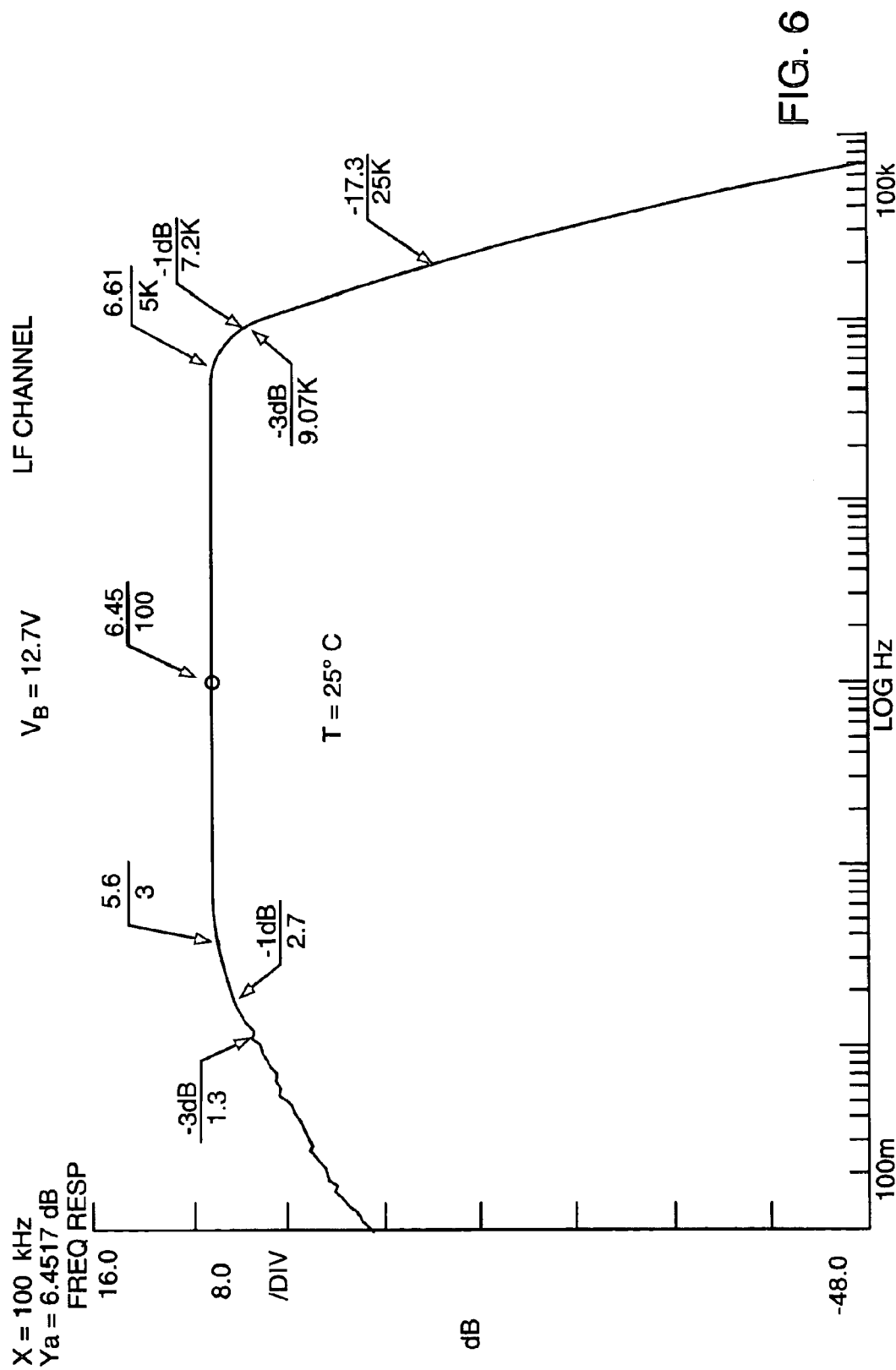
FIG. 6 is a Bode plot of a measured frequency response of the low-frequency output of the sensor of FIG. 2 at a temperature of 25 degrees Celsius.

FIG. 6 is a Bode plot of a measured frequency response of the low-frequency output of the implementation of the sensor 13 of FIG. 2 at the temperature of 25 degrees Celsius. For the reference frequency of 100 Hz, the −3 dB points are measured to be 1.3 Hz and 9.07 kHz as expected for the two-pole low-pass filter configuration discussed above and shown on FIG. 2.

Figure 7:
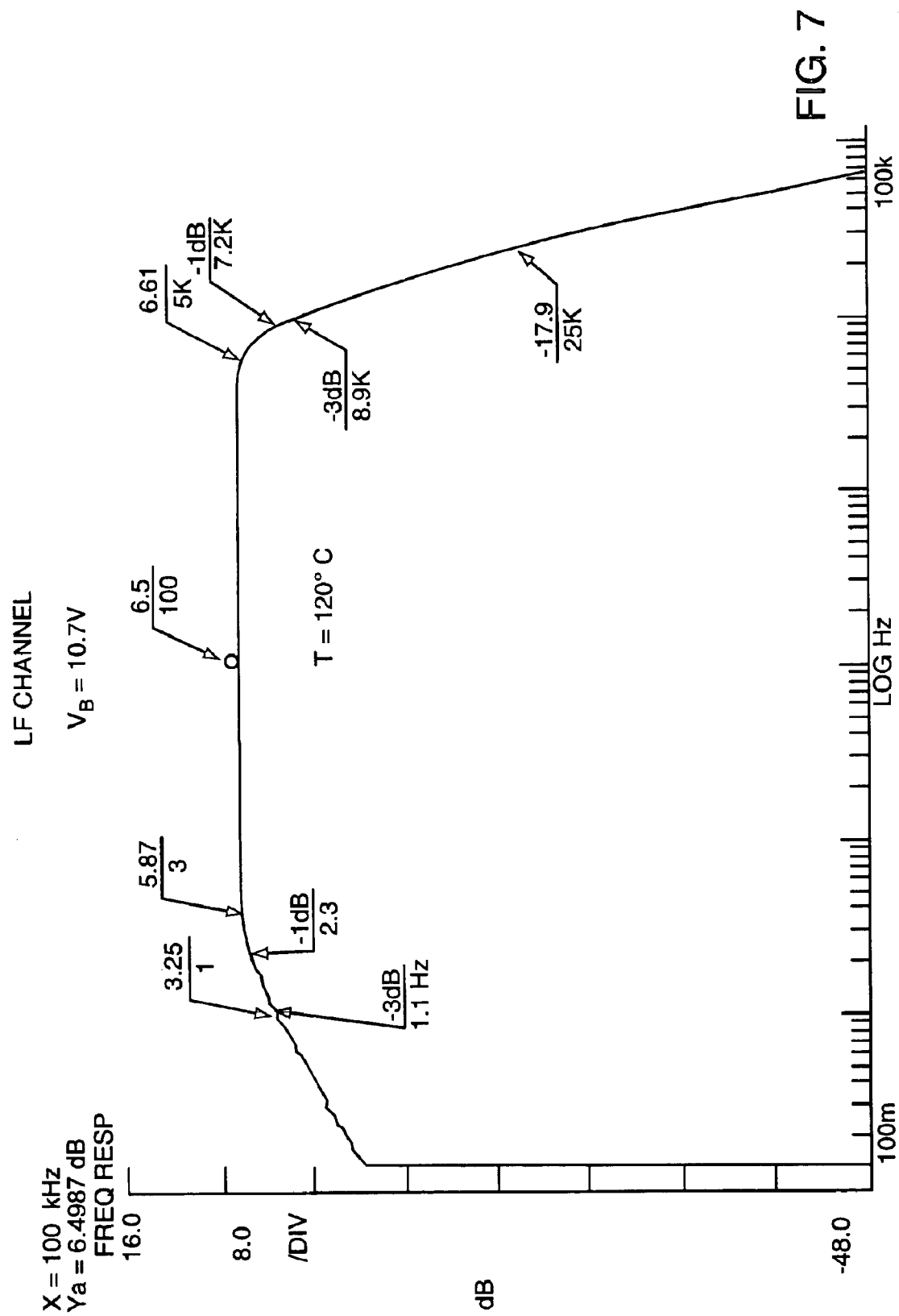
FIG. 7 is a Bode plot of a measured frequency response of the low-frequency output of the sensor of FIG. 2 at a temperature of 120 degrees Celsius.

FIG. 7 is a Bode plot of a measured frequency response of the low-frequency output of the implementation of the sensor 13 of FIG. 2 at the temperature of 120 degrees Celsius.

Results from the simulation and measured response of the breadboard circuit implementing the sensor 13 shown on FIG. 2 indicate that the maximum deviation of the gain is about 6% and the bias deviation is about 2 volts DC in the temperature range of 25–120 degrees Celsius.

The following table provides approximate performance specifications for the implementation of the sensor 13 of FIG. 2. These are exemplary specifications for a particular embodiment provided for illustrative purposes and not intended to limit the principles of the present invention.

| | |
|---|---|
| Source capacitance | 1000 pC ± 10% |
| Output impedance | 10 ohms |
| DC output bias (over the temperature range) | 8–13 V DC |
| Maximum output voltage | 5 V peak |
| Frequency response for the LF output (100 Hz reference) | 10%: 3 Hz–5 kHz |
| Frequency response for the LF output (100 Hz reference) | −3 dB: 1.5 Hz–8 kHz |
| Frequency response for the HF output (27 kHz reference) | −3 dB: 19 kHz–52 kHz |
| Gain (each channel) | 2 mV/pC |
| Residual noise for the LF output (2 Hz to 20 kHz) | 25 μV rms typical |
| Residual noise for the HF output (2 Hz to 100 kHz) | 22 μV rms typical |
| Warm-up time | 5 sec |
| Power requirements | Powered from positive constant current source |
| Supply voltage | 22 to 30 V DC |
| Supply current (for each channel) | 4 mA nominal, 2 to 10 mA operating range |
| Operating temperature | −50° C. to +120° C. (−58° F. to +248° F.) |
| Non-operating temperature | −73° C. to +150° C. (−100° F. to +302° F.) |

Figure 8:
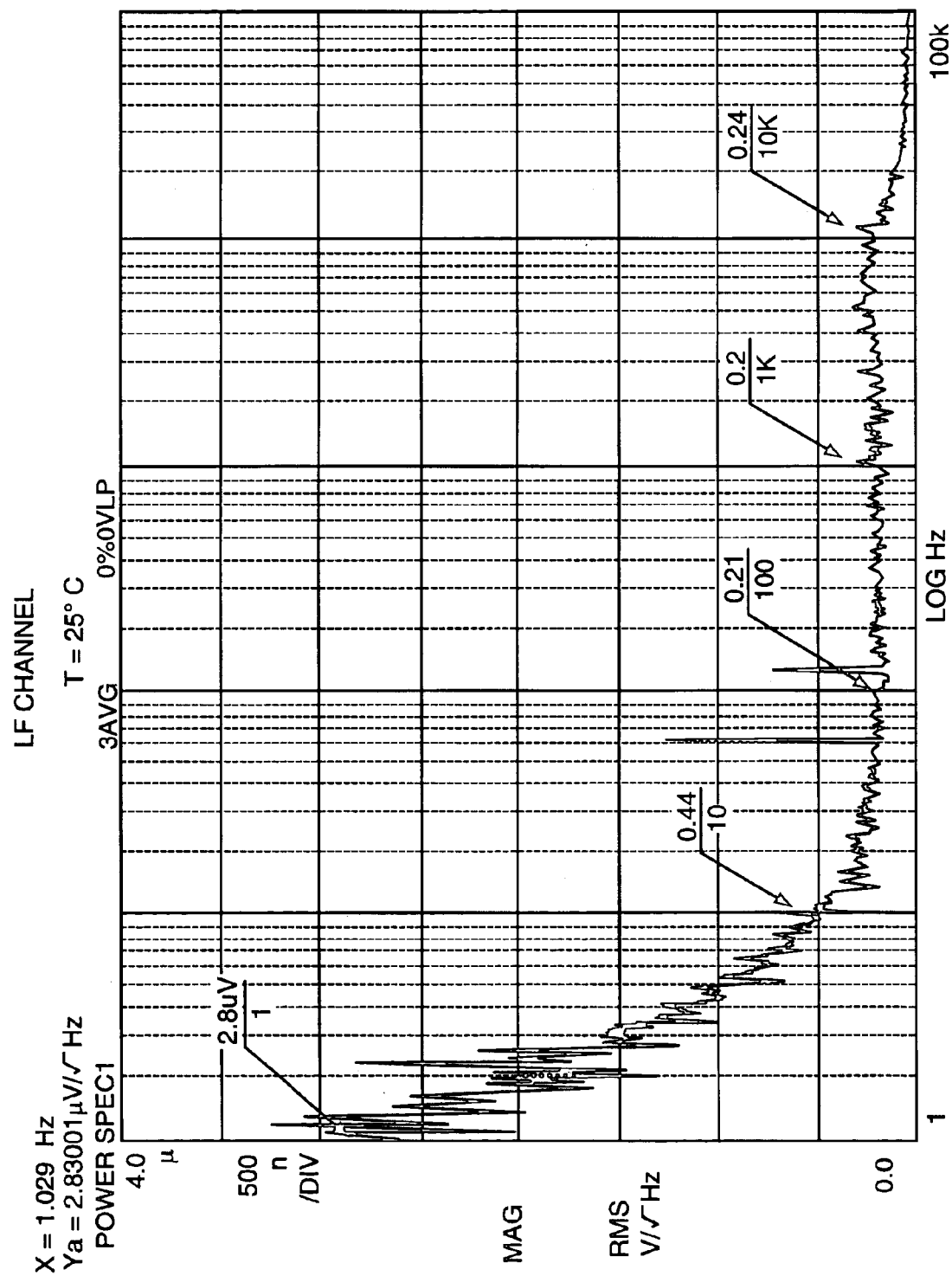
FIG. 8 is a Bode plot of a measured noise spectrum of the low-frequency output of the sensor of FIG. 2 at a temperature of 25 degrees Celsius.
Figure 9:
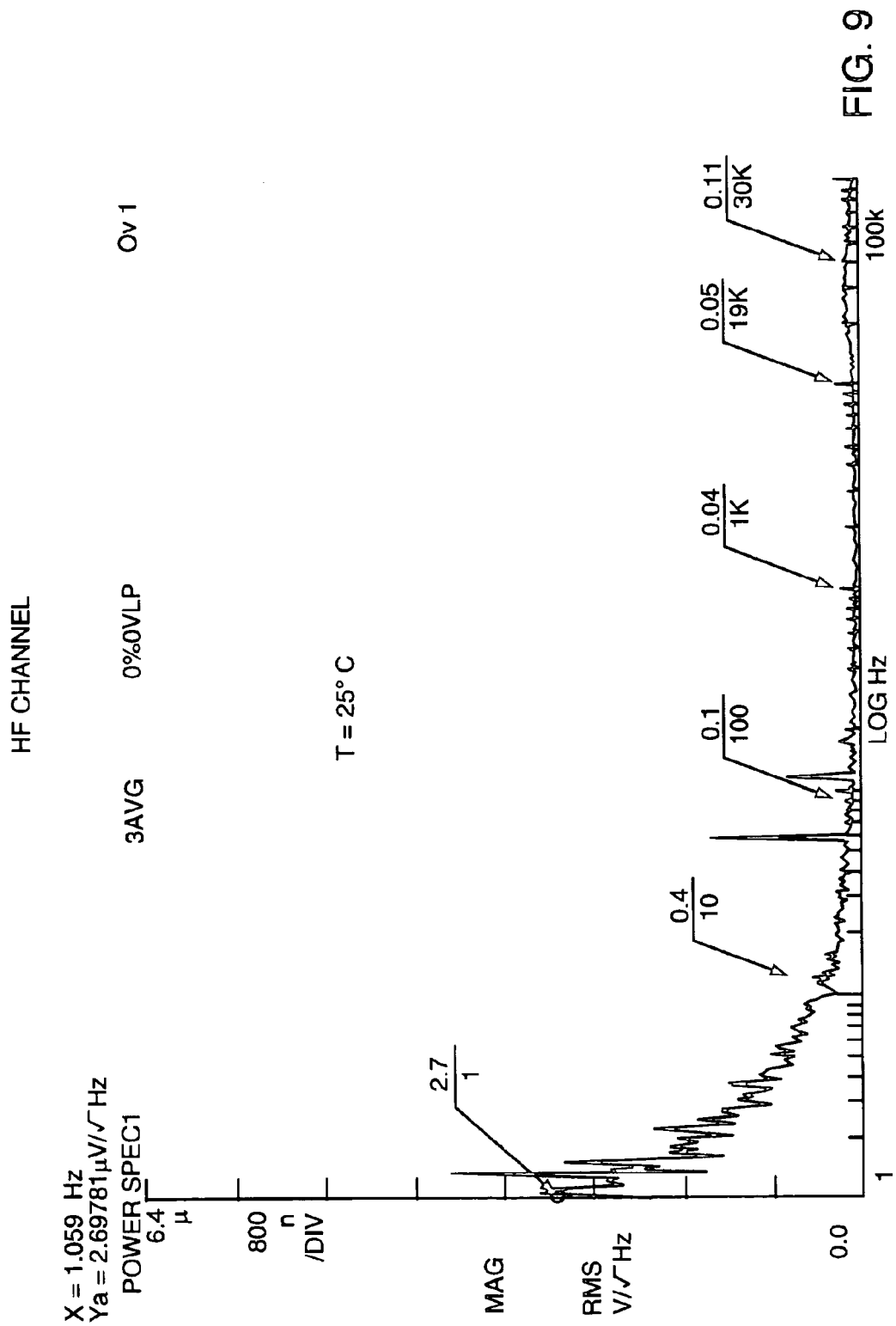
FIG. 9 is a Bode plot of a measured noise spectrum of the high-frequency output of the sensor of FIG. 2 at a temperature of 25 degrees Celsius.

In the Bode plots of FIGS. 8 and 9, the units of the horizontal logarithmic axis is frequency and units of the vertical linear axis is the voltage spectral density. The measurements were taken at a temperature of 25 degrees Celsius with the input of the circuit connected to ground 0, i.e. with the grounded input, where the transducer behaves essentially as a 1050 pF capacitor.

FIG. 8 is a Bode plot of a grounded-input noise response spectrum measured at the output of the low-frequency channel circuit 2 of the implementation of the sensor 13 of FIG. 2 at a temperature of 25 degrees Celsius.

FIG. 9 is a Bode plot of a grounded-input noise response spectrum measured at the output of the high-frequency channel circuit 4 of the implementation of the sensor 13 of FIG. 2 at a temperature of 25 degrees Celsius.

The noise measurements represented by the plots of FIGS. 8 and 9 show the values of a noise spectrum that are practically identical to such values specified for traditional sensors. Thus, the noise measurements provide confidence that there is little cross-coupling between the low-frequency channel 2 and high-frequency channel 4.

While this invention has been particularly shown and described with references to preferred embodiments thereof, it will be understood by those skilled in the art that various changes in form and details may be made therein without departing from the scope of the invention encompassed by the appended claims.

The sensor 13 can be implemented, for example, using surface mount technology or chip and wire technology. The analog circuits described herein can be implemented in digital circuitry or signal processing technology. It should be understood that typical techniques of conversion of filters from analog to digital form can be used to implement in digital form the filtering features of the analog circuits described herein. For a digital processing implementation, analog-to-digital and digital-to-analog converters to sample and output the processed signal, respectively, can be used. Further, supporting analog circuitry, such as the buffer 10 and Nyquist filters, may be employed in the digital embodiment.

What is claimed is:

1. A system for converting sensed force or mechanical motion into corresponding electrical signals, comprising:
   a transducer providing an electrical signal as a function of sensed force or mechanical motion;
   at least two filters coupled to the output of the transducer and outputting filtered electrical signals over respective multiple frequencies, at least one of the at least two filters coupled to the transducer at the output of the transducer directly through a passive circuit;
   at least one of said at least two filters including a buffer that isolates the inputs of said at least two filters from one another; and
   at least one high impedance element external from the buffer to provide output electrical characteristics of the transducer in at least one of the at least two filters.

2. The system as claimed in claim 1, wherein at least one of said at least two filters includes a low-pass filter and another of said at least two filters includes a high-pass filter.

3. The system as claimed in claim 2, wherein the low-pass filter passes frequencies in a linear region of the transducer and the high-pass filter passes a resonance frequency of the transducer.

4. The system as claimed in claim 1, wherein the filters in said at least two filters filter and amplify the electrical signal.

5. The system as claimed in claim 1, wherein said at least two filters filter, amplify and offset the electrical signal.

6. The system as claimed in claim 1, wherein the buffer is arranged in a source follower configuration.

7. The system as claimed in claim 1, wherein the buffer employs an operational amplifier.

8. The system as claimed in claim 1, wherein one of the at least two filters includes a low-pass filter and power is supplied to the buffer by the output of the low-pass filter.

9. The system as claimed in claim 1, wherein the filters use a JFET transistor to amplify the electrical signal.

10. The system as claimed in claim 1, wherein the filters use at least one JFET transistor to decrease temperature dependence of characteristics of the filters.

11. The system as claimed in claim 1, wherein the filters have low output impedance.

12. The system as claimed in claim 1, wherein the filters use at least one transistor to provide low output impedance.

13. The system as claimed in claim 1, wherein the filters use a Darlington combination of transistors to provide low output impedance.

14. The system as claimed in claim 1, wherein the filters use a Darlington transistor to provide low output impedance.

15. The system as claimed in claim 1, wherein at least one of the at least two filters includes a passive low-pass filter circuit.

16. The system as claimed in claim 1, wherein at least one of the filters includes a passive high-pass filter circuit.

17. The system as claimed in claim 1, wherein the transducer is a piezoelectric transducer.

18. A method for converting sensed force or mechanical motion into corresponding electrical signals, comprising:
   providing a transducer generating an electrical signal as a function of sensed force or mechanical motion;
   at the output of the transducer, channelizing the electrical signal into at least a first filter and a second filter, the channelizing including channelizing the electrical signal at the output of the transducer directly through a passive circuit to at least one of the first filter or the second filter;
   buffering the electrical signal in a manner allowing for independent filtering by the first and second filters;
   by the first and second filters, filtering the electrical signal into respective frequency bands;
   outputting the filtered electrical signals over respective multiple frequencies; and
   passing the electrical signal through an electrical element having characteristics similar to the output impedance of the transducer prior to filtering the electrical signal into at least one of the frequency bands.

19. The method as claimed in claim 18, wherein said filtering the electrical signal includes low-pass filtering the electrical signal.

20. The method as claimed in claim 18, wherein said filtering the electrical signal includes high-pass filtering the electrical signal.

21. The method as claimed in claim 18, wherein said filtering the electrical signal includes filtering and amplifying the electrical signal.

22. The method as claimed in claim 18, wherein said filtering the electrical signal includes filtering, amplifying, and offsetting the electrical signal.

23. The method as claimed in claim 18, further including employing a single power source to provide power for the buffering.

24. The method as claimed in claim 18, wherein said filtering the electrical signal includes decreasing temperature sensitivity.

25. The method as claimed in claim 18, wherein said outputting the electrical signal includes providing the electrical signal in said at least first and second frequency bands with a low output impedance.

26. The method as claimed in claim 18, wherein said filtering the electrical signal includes passive low-pass filtering.

27. The method as claimed in claim 18, wherein said filtering the electrical signal includes passive high-pass filtering.

28. A system for converting sensed force or mechanical motion into electrical signals, comprising:
  means for providing an electrical signal as a function of sensed force or mechanical motion; and
  at the output of said means for providing the electrical signal, means for channelizing said electrical signal into at least two channels; and
  in the at least two channels, means for filtering the electrical signal and outputting the filtered electrical signal over respective multiple frequencies, at least one of the means for filtering the electrical signal coupled to the transducer at the output of the transducer directly through a passive circuit; and
  at least one of the means for filtering the electrical signal including means for buffering the electrical signal to isolate the at least two channels from one another and means, external from said means for buffering, for providing the electrical characteristics similar to those provided by said means for providing the electrical signal.

29. An electronic circuit for processing an electrical signal corresponding to a sensed force or mechanical motion, comprising:
  at least two filter modules adapted to be coupled to a transducer providing an electrical signal, at least one of the said at least two filter modules coupled to the transducer at the output of the transducer directly through a passive circuit, said at least two filter modules adapted to filter the electrical signal into respective frequency bands and to provide respective filtered electrical signals over respective multiple frequencies on respective circuit outputs;
  a buffer, electrically disposed in at least one of said at least two filter modules, that isolates respective inputs of said at least two filter modules from one another; and
  at least one impedance element external from the buffer that provides the electrical characteristics similar to those provided by the transducer.

30. The electronic circuit as claimed in claim 29, wherein said at least two filter modules include a low-pass filter.

31. The electronic circuit as claimed in claim 29, wherein said at least two filter modules include a high-pass filter.

32. The electronic circuit as claimed in claim 29, wherein said at least two filter modules filter and amplify the electrical signal.

33. The electronic circuit as claimed in claim 29, wherein said at least two filter modules filter, amplify, and offset the electrical signal.

34. The electronic circuit as claimed in claim 29, wherein said buffer is arranged in a source follower configuration.

35. The electronic circuit as claimed in claim 29, wherein said buffer employs an operational amplifier.

36. The electronic circuit as claimed in claim 29, wherein one of said at least two filter modules is a low-pass filter and power is supplied to said buffer by an output of said low-pass filter.

37. The electronic circuit as claimed in claim 29, wherein at least one of said at least two filter modules uses a JFET transistor to amplify the electrical signal.

38. The electronic circuit as claimed in claim 29, wherein at least one of said at least two filter modules uses at least one JFET transistor to decrease temperature sensitivity of characteristics of the filter module.

39. The electronic circuit as claimed in claim 29, wherein at least one of said at least two filter modules has low output impedance.

40. The electronic circuit as claimed in claim 39, wherein at least one of said at least two filter modules uses at least one transistor to provide the low output impedance.

41. The electronic circuit as claimed in claim 39, wherein at least one of said at least two filter modules uses a Darlington combination of transistors to provide the low output impedance.

42. The electronic circuit as claimed in claim 29, wherein at least one of said at least two filter modules includes a passive low-pass filter circuit.

43. The electrical circuit as claimed in claim 29, wherein at least one of said at least two filter modules includes a passive high-pass filter circuit.

44. A system for converting sensed force or mechanical motion into corresponding electrical signals, comprising:
  a transducer providing an electrical signal as a function of sensed force or mechanical motion;
  at least two filters coupled to the output of the transducer and outputting filtered electrical signals over respective multiple frequencies, at least one of the at least two filters being a low pass filter; and
  at least one other of said at least two filters, electrically disposed in a buffer, that receives power from the low pass filter.

45. The system as claimed in claim 44, wherein said at least one other of said at least two filters includes a high-pass filter.

46. The system as claimed in claim 45, wherein the low-pass filter passes frequencies in a linear region of the transducer and the high-pass filter passes a resonance frequency of the transducer.

47. The system as claimed in claim 44, wherein the filters in said at least two filters filter and amplify the electrical signal.

48. The system as claimed in claim 44, wherein said at least two filters filter, amplify, and offset the electrical signal.

49. The system as claimed in claim 44, further including at least one high impedance element external from the buffer to provide the output electrical characteristics of the transducer in at least one of the at least two filters.

50. The system as claimed in claim 44, wherein the buffer is arranged in a source follower configuration.

51. The system as claimed in claim 44, wherein the buffer employs an operational amplifier.

52. The system as claimed in claim 44, wherein at least one of the at least two filters includes a passive low-pass filter circuit.

53. The system as claimed in claim 44, wherein at least one of the filters includes a passive high-pass filter circuit.

54. The system as claimed in claim 44, wherein the transducer is a piezoelectric transducer.

55. An electronic circuit for processing an electrical signal corresponding to a sensed force or mechanical motion, comprising:
  at least two filter modules adapted to be coupled to a transducer providing an electrical signal, at least one of the said at least two filter modules coupled to the transducer at the output of the transducer directly through a passive circuit, said at least two filter modules adapted to filter the electrical signal into respective frequency bands and to provide respective filtered electrical signals over respective multiple frequencies on respective circuit outputs;
  a buffer, electrically disposed in at least one of said at least two filter modules, that isolates respective inputs of said at least two filter modules from one another; and
  one of said at least two filter modules is a low-pass filter and power is supplied to said buffer by an output of said low-pass filter.

* * * * *

UNITED STATES PATENT AND TRADEMARK OFFICE
CERTIFICATE OF CORRECTION

| | | |
|---|---|---|
| PATENT NO. | : 7,036,378 B2 | Page 1 of 1 |
| APPLICATION NO. | : 09/924960 | |
| DATED | : May 2, 2006 | |
| INVENTOR(S) | : Levinzon | |

It is certified that error appears in the above-identified patent and that said Letters Patent is hereby corrected as shown below:

On the Title page #75 Col. 1 line 1 please change inventor name from Feliz to Felix.

Signed and Sealed this

Twenty-second Day of August, 2006

JON W. DUDAS
*Director of the United States Patent and Trademark Office*